(12) United States Patent
Wang et al.

(10) Patent No.: US 8,390,637 B2
(45) Date of Patent: Mar. 5, 2013

(54) METHOD FOR FRAME MEMORY ACCESS AND DISPLAY DRIVER USING THE SAME

(75) Inventors: Szu-Mien Wang, Tai-Pei (TW);
Dan-Chi Yang, Hsin-Chu County (TW);
Shih Chuan Huang, Tao-Yuan County (TW)

(73) Assignee: Orise Technology Co., Ltd., Hsinchu (TW)

( * ) Notice: Subject to any disclaimer, the term of this patent is extended or adjusted under 35 U.S.C. 154(b) by 987 days.

(21) Appl. No.: 12/424,918

(22) Filed: Apr. 16, 2009

(65) Prior Publication Data
US 2010/0123730 A1    May 20, 2010

(30) Foreign Application Priority Data
Nov. 14, 2008    (TW) ................................. 97143986 A

(51) Int. Cl.
*G09G 5/36*    (2006.01)
(52) U.S. Cl. ...................................... 345/545; 345/204

(58) Field of Classification Search .................. 345/545, 345/204
See application file for complete search history.

(56) References Cited

U.S. PATENT DOCUMENTS

| 4,546,451 A * | 10/1985 | Bruce ........................... 345/571 |
| 6,400,851 B1 * | 6/2002 | Shih .............................. 382/297 |
| 2006/0284904 A1 * | 12/2006 | Ng ................................ 345/691 |

* cited by examiner

*Primary Examiner* — Maurice L McDowell, Jr.
(74) *Attorney, Agent, or Firm* — Muncy, Geissler, Olds & Lowe, PLLC

(57) ABSTRACT

The present invention relates to a method for frame memory access and a display driver using the same. The method is a data moving method for allowing a display driver integrated circuit built in a portrait style frame memory to be used in a landscape mode. The spirit of the method is to repeatedly read data from the portrait style frame memory to the shift register, and move the data on the shift register to put the data to the correct data latch to constitute complete scan line data. Therefore, the portrait style display driver integrated circuit may drive a landscape mode display panel.

2 Claims, 13 Drawing Sheets

METHOD FOR FRAME MEMORY ACCESS AND DISPLAY DRIVER USING THE SAME

This application claims priority of No. 097143986 filed in Taiwan R.O.C. on Nov. 14, 2008 under 35 USC 119, the entire content of which is hereby incorporated by reference.

BACKGROUND OF THE INVENTION

1. Field of the Invention

The present invention relates to the technology of a display driver, and more particularly to a memory access method for a portrait display and a landscape display, and a display driver circuit.

2. Related Art

With the progress of the technology, mobile telephones become more and more popularized and have more and more functions. At present, the current mobile telephone starts to provide the digital television service. In order to satisfy the digital television specification, a portrait mode panel adopted in the conventional mobile telephone has to be changed to a landscape mode panel.

In order to utilize the resource effectively, one display driver integrated circuit is configured such that it can be applied to various panels. Taking the panels having the same resolution of 320×240 (Quarter Video Graphics Array, QVGA) as an example, the challenge induced when the same integrated circuit is applied to the portrait mode and the landscape mode panels is how to effectively apply the frame memory embedded in the integrated circuit. The capacities of the frame memories for the portrait mode and the landscape mode are the same, but the numbers of scan lines needed in one frame and the numbers of pixels needed on each scan line in the two modes are different. The portrait mode QVGA panel needs 320 scan lines, and 240 pixels are needed on each scan line. The landscape mode QVGA panel needs 240 scan lines, and 320 pixels are needed on each scan line.

Based on the display driver integrated circuit architecture, the frame memory is configured to satisfy the requirement of the resolution of the panel. If one QVGA panel needs 320 scan lines in the portrait mode, and each scan line needs 240 pixels, then the frame memory is configured to have 320 word lines each having 240×24 bit lines.

However, if the portrait mode display driver integrated circuit is applied to the landscape mode panel, the pixels on each word line of its internal frame memory are fewer than the 320 pixels required for a landscape display, and the lack of the required memory of 80 pixels on each word line of its internal frame memory will occur. Although the total capacity of the frame memory is kept unchanged, the number of pixels on each scan line is changed. Thus, the display driver integrated circuit cannot be simultaneously applied to the landscape mode panel and the portrait mode panel.

SUMMARY OF THE INVENTION

In view of this, it is therefore an objective of the present invention to provide a method for frame memory access and a display driver using the same.

To achieve the above-identified or other objectives, the present invention provides a method for frame memory access. The method is for storing an image with N×M pieces of pixel data to a memory with M×N storage spaces. The method includes the steps of: correspondingly storing the $1^{st}$ to $M^{th}$ pieces of pixel data of the $1^{st}$ to $M^{th}$ rows of the image to the $1^{st}$ to $M^{th}$ rows of storage spaces of the memory; and sequentially and correspondingly storing the $(M+1)^{th}$ to $N^{th}$ pieces of pixel data of the $1^{st}$ to $M^{th}$ rows of the image to the $(M+1)^{th}$ to $N^{th}$ rows of storage spaces of the memory. When the pixel data of the $i^{th}$ row of the image stored in the memory are read, the method further includes the steps of: reading the data stored in the $k^{th}$ row of storage spaces of the memory to the $1^{st}$ to $M^{th}$ temporary storage positions of a shift register, wherein the $(M+1)^{th}$ to $N^{th}$ pieces of pixel data of the $i^{th}$ row of the image are stored in the $k^{th}$ row of storage spaces of the memory; shifting the $(M+1)^{th}$ to $N^{th}$ pieces of pixel data of the $i^{th}$ row of the image stored in the shift register to the $(M+1)^{th}$ to $N^{th}$ temporary storage positions of the shift register; and reading the data stored in the $i^{th}$ row of storage spaces of the memory to the $1^{st}$ to $M^{th}$ temporary storage positions of the shift register, wherein N, M, i and k are natural numbers, and N>M, 0<i<=N, M<k<=N.

In the method for frame memory access according to the preferred embodiment of the present invention, when $(M+1)^{th}$ to $X^{th}$ pieces of pixel data of the $i^{th}$ row are stored in the $k^{th}$ row of the memory, and the $(X+1)^{th}$ to $N^{th}$ pieces of pixel data of the $i^{th}$ row are stored in the $(k+1)^{th}$ row of the memory, the method further includes the steps of: reading the data stored in the $k^{th}$ row of storage spaces of the memory to the $1^{st}$ to $M^{th}$ temporary storage positions of the shift register; shifting the $(M+1)^{th}$ to $X^{th}$ pieces of image data of the $i^{th}$ row of the image stored in the shift register to the $(M+1)^{th}$ to $X^{th}$ temporary storage positions of the shift register; reading the data stored in the $(k+1)^{th}$ row of storage spaces of the memory to the $1^{st}$ to $M^{th}$ temporary storage positions of the shift register; and shifting the $(X+1)^{th}$ to $N^{th}$ pieces of image data of the $i^{th}$ row of the image stored in the shift register to the $(X+1)^{th}$ to $N^{th}$ temporary storage positions of the shift register, wherein X is a natural number, and M<x<=N.

The present invention further provides a display driving device adopted to drive a panel having N×M pixels or a panel having M×N pixels. The display driving device includes a memory, a shift register and a driving circuit. The memory has M×N storage spaces. The shift register has N temporary storage circuits. The $i^{th}$ temporary storage circuit is coupled to the $i^{th}$ column of storage spaces of the memory. An $i^{th}$ input terminal of the driving circuit is coupled to the $i^{th}$ temporary storage circuit of the shift register, and each of the temporary storage circuits has a corresponding temporary storage position. When the display driving device is for driving the panel having N×M pixels, a driving stage of the display driving device includes a storing stage and a driving stage. In the storing stage, the $1^{st}$ to $M^{th}$ pieces of pixel data of the $1^{st}$ to $M^{th}$ rows of an image having N×M pieces of pixel data are correspondingly stored to the $1^{st}$ to $M^{th}$ rows of storage spaces of the memory; and the $(M+1)^{th}$ to $N^{th}$ pieces of pixel data of the $1^{st}$ to $M^{th}$ rows of the image are sequentially and correspondingly stored to the $(M+1)^{th}$ to $N^{th}$ rows of storage spaces of the memory. In an $i^{th}$ row of driving periods of the driving stage, the data stored in the $k^{th}$ row of storage spaces of the memory are stored to the $1^{st}$ to $M^{th}$ temporary storage positions of the shift register, wherein the $k^{th}$ row of storage spaces of the memory store the $(M+1)^{th}$ to $N^{th}$ pieces of pixel data of the $i^{th}$ row of the image; the $(M+1)^{th}$ to $N^{th}$ pieces of pixel data of the $i^{th}$ row of the image stored in the shift register are shifted to the $(M+1)^{th}$ to $N^{th}$ temporary storage positions of the shift register; the data stored in the $i^{th}$ row of storage spaces of the memory are read to the $1^{st}$ to $M^{th}$ temporary storage positions of the shift register; and the data stored in the register are read such that the driving circuits drive the $i^{th}$ row of pixels of the panel having N×M pixels, wherein, N, M, i and k are natural numbers, and N>M, 0<i<=N, M<k<=N.

The present invention mainly provides a data moving method of enabling the display driver integrated circuit with the built-in portrait style frame memory to be applied to the landscape mode. The spirit of this method is to repeatedly read the data from the portrait style frame memory and write the data to the shift register, to move the data over the shift register, and to put the data to the correct data latch so as to constitute the complete scan line data, and to transfer the complete scan line data to the pixel driving circuit. Thus, the portrait style display driver integrated circuit can drive the landscape mode display panel.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

In order to make the display driver circuit be applied to the portrait mode and the landscape mode panels, the frame memory of the display driver circuit of the present invention is the portrait display frame memory. In order to describe the spirit of the present invention, a QVGA panel will be described, wherein the frame memory has 320 word lines each having 240×24 bit lines.

Figure 1:
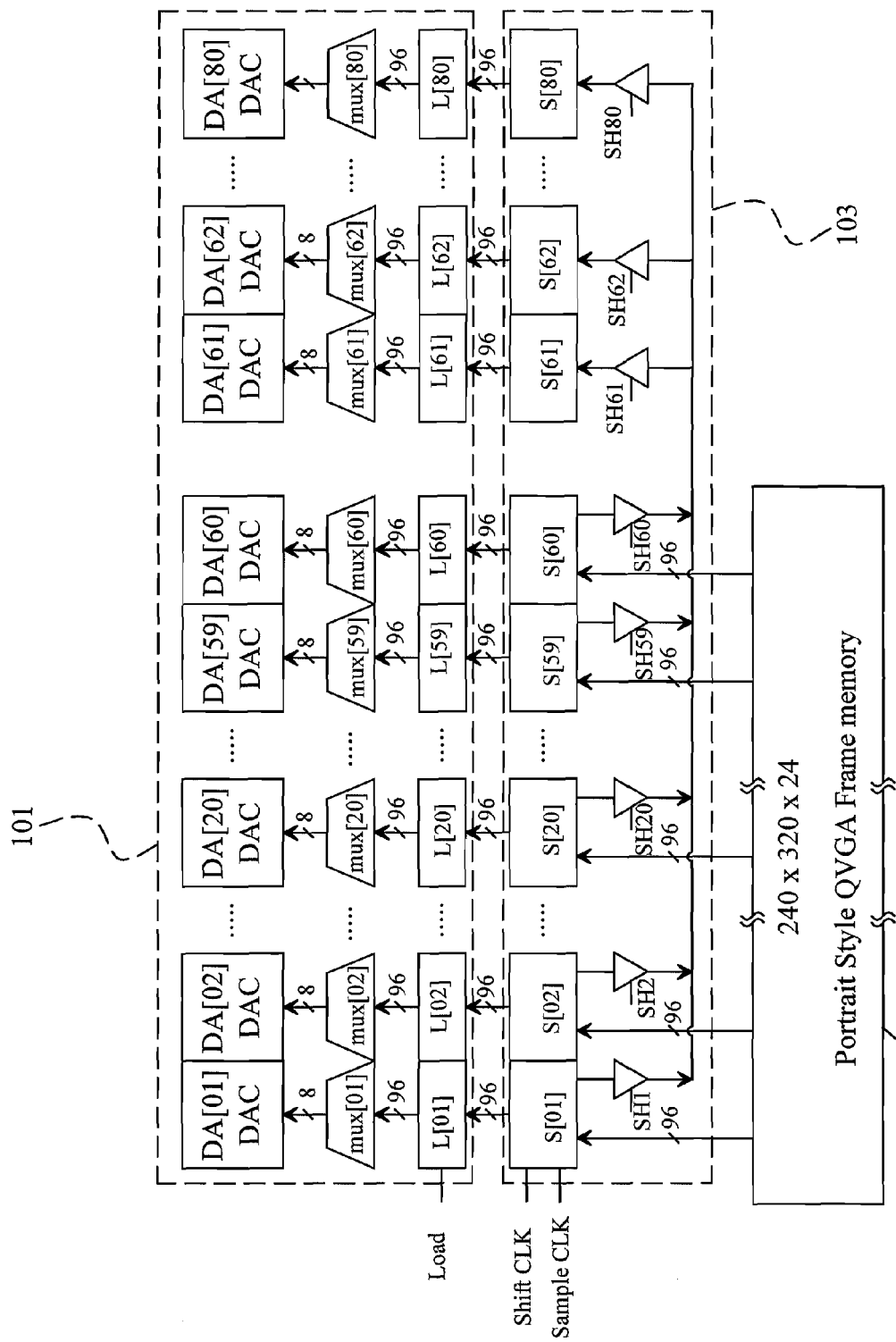
FIG. 1 is a circuit block diagram showing a display driving device according to an embodiment of the present invention.

FIG. 1 is a circuit block diagram showing a display driving device according to an embodiment of the present invention. Referring to reference FIG. 1, the display driving device includes a driving circuit 101, a memory 102 and a shift register 103. The driving circuit 101 includes multiple digital-to-analog converters DA[01] to DA[80], multiple multiplexers mux[01] to mux[80] and multiple data latches L[01] to L[80]. The shift register 103 includes multiple temporary storage circuits. If one temporary storage circuit stores one pixel, each temporary storage circuit needs to store three sub-pixels in total. Because each sub-pixel has 8 bits, each temporary storage circuit has 3×8 bits. In addition, the temporary storage circuit of the shift register in this embodiment is divided into 80 groups S[01] to S[80] each having 12×8 bits.

In order to be compatible with two resolutions of 240×320 (portrait mode) and 320×240 (landscape mode) simultaneously, the pixel driving circuit of the resolution of 240×320 is adopted in the pixel driving circuit of the display driving circuit 101. In this embodiment, the configuration of the 12:1 source driver is illustrated as an example. In order to drive 320 pixels each having three sub-pixels R, G and B, 80 channels DA[01] to DA[80] are needed. In other words, there are 80 analog-to-digital converters DA[01] to DA[80] in total.

In addition, the memory 102 of this embodiment is a portrait style frame memory. In other words, the frame memory 102 has 320 word lines respectively corresponding to 320 scan lines. Each word line has 240×24 bit lines respectively corresponding to 240×3 (R, G, B) pixels. More particularly, the shift register 103 is added in this embodiment, and the total storage spaces of the shift register 103 are 320×24 bits (320×3 sub-pixels each needing 8 bits). The $1^{st}$ to $60^{th}$ channels DA[01] to DA[60] correspond to 240 pixels and each column of the frame memory 102. To achieve the landscape mode display, additional 20 channels DA[61] to DA[80] are needed to correspond to the display requirements of the $241^{st}$ to $320^{th}$ pixels.

Figure 2A:
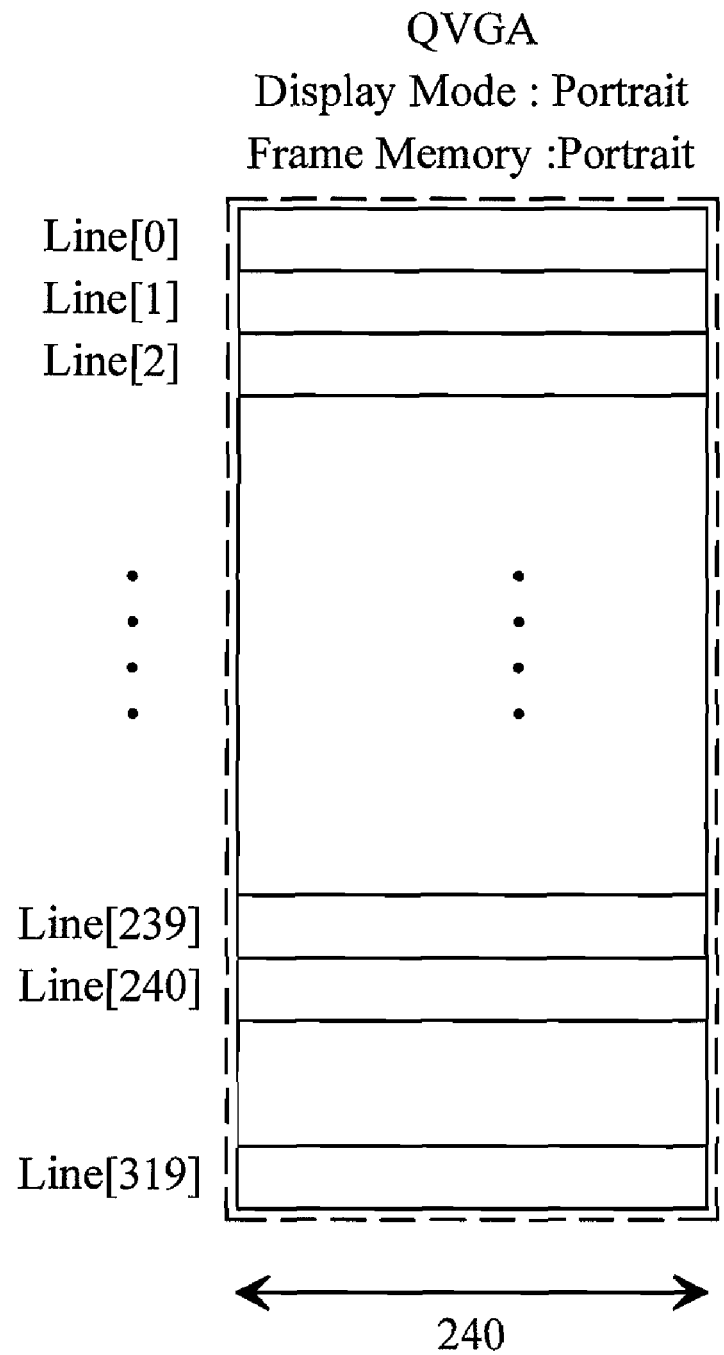
FIG. 2A shows the configuration of a frame memory 102 according to the embodiment of the present invention.
Figure 2B:
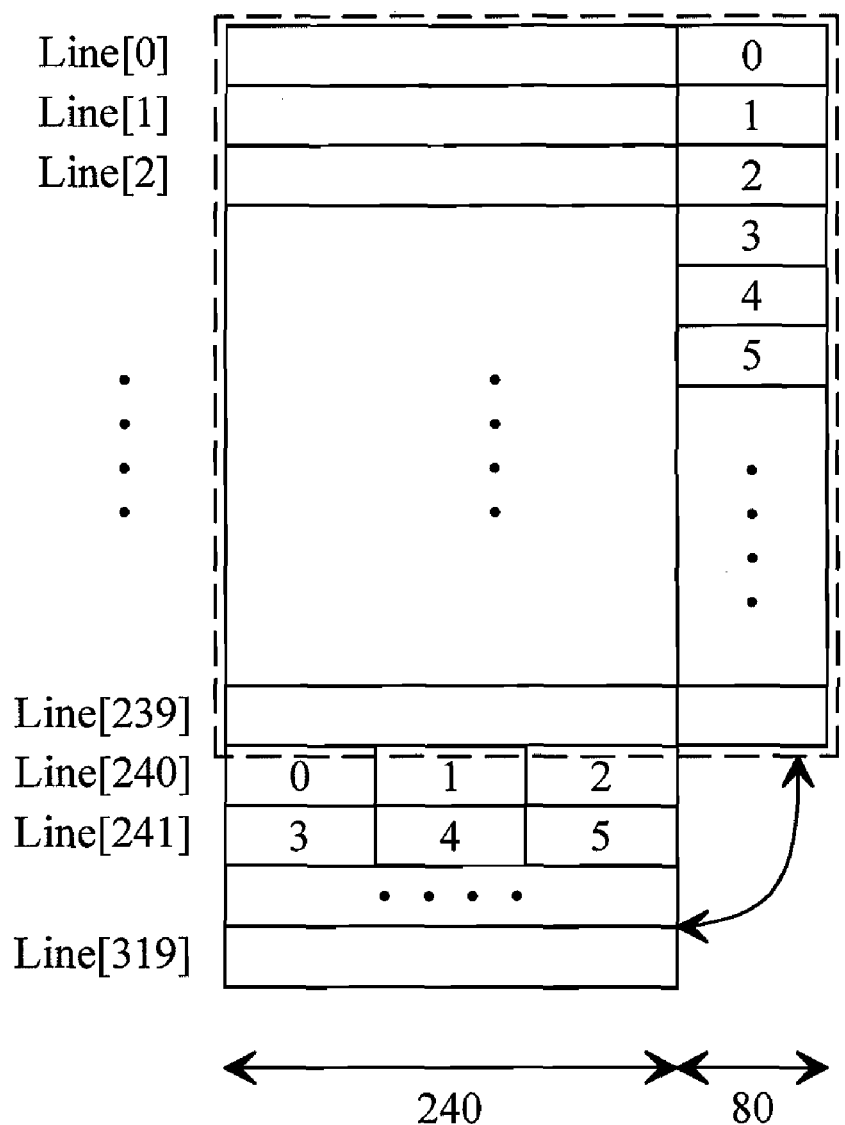
FIG. 2B is a schematic illustration showing how the frame memory 102 according to the embodiment of the present invention stores the image with the resolution of 320×240 in a landscape mode.

FIG. 2A shows the configuration of the frame memory 102 according to the embodiment of the present invention. FIG. 2B is a schematic illustration showing how the frame memory 102 according to the embodiment of the present invention stores the image with the resolution of 320×240 in the landscape mode. Referring to FIGS. 2A and 2B, the data sizes of the image of the resolution of 320×240 and the image of the resolution of 240×320 are substantially the same. Thus, the frame memory 102 can absolutely store the data. However, if the data are stored arbitrarily, the data cannot be easily taken out and may cause the poor efficiency of the circuit operation. In this embodiment, the method of storing the image data in the frame memory 102 is to store the first 240 pixels of each row to the corresponding storage positions of each row of the frame memory 102. That is, the first 240 pixels of the $i^{th}$ row of the image data are stored in the $i^{th}$ row of the frame memory 102. At this time, each row of the image data still has 80 pixels that have not been stored yet. Next, the remaining 80 pixels of each row of the image data are sequentially stored to the $241^{st}$ to $320^{th}$ rows (Line[239] to Line[319]) of the frame memory 102. This purposes and advantages of this storing method will be described in the following embodiments.

Figure 3A:
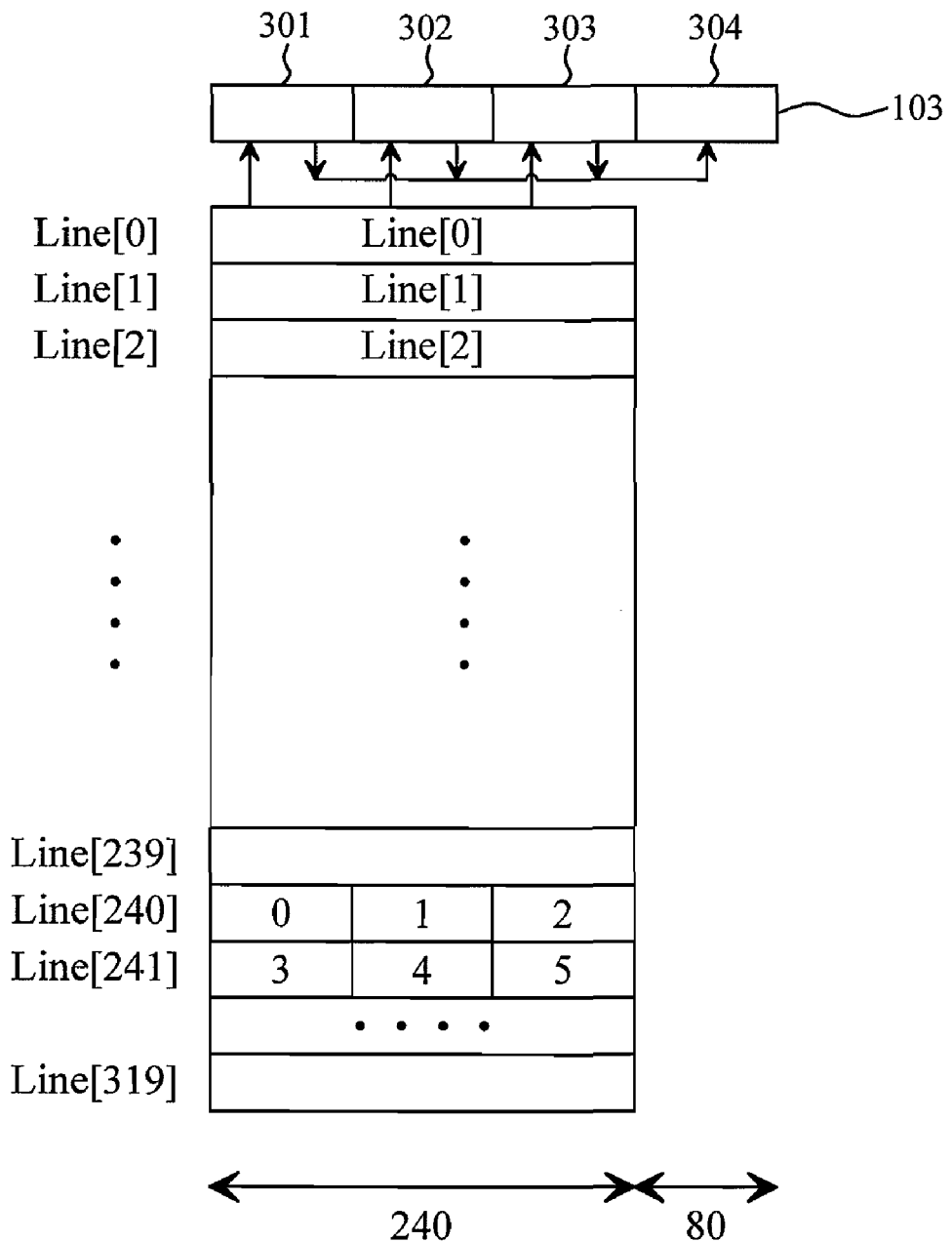
FIGS. 3A to 3D are schematic illustrations showing how the embodiment of the present invention reads the image, which has the resolution of 320×240 in the landscape mode and is stored in the frame memory 102.
Figure 3B:
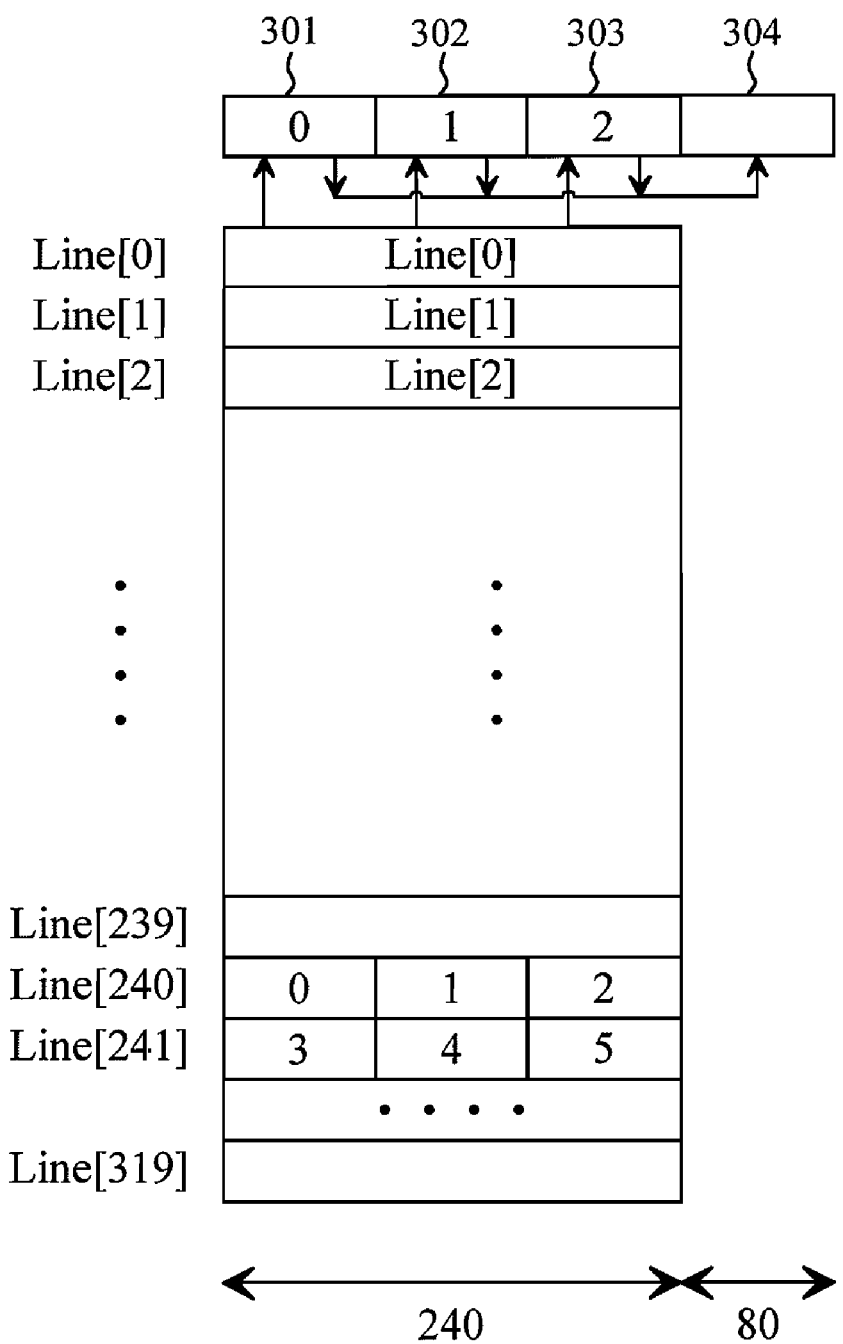
Figure 3C:
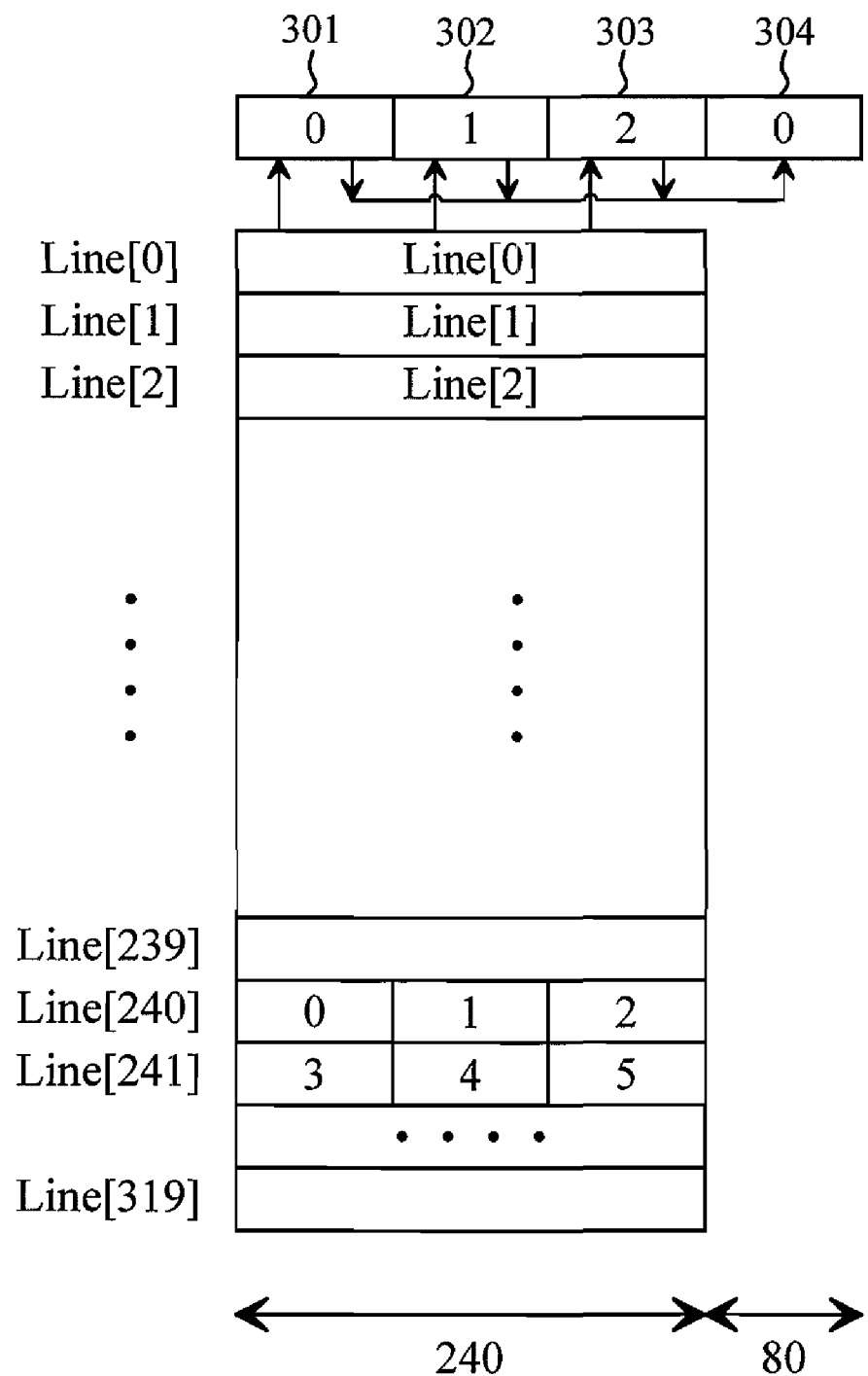
Figure 3D:
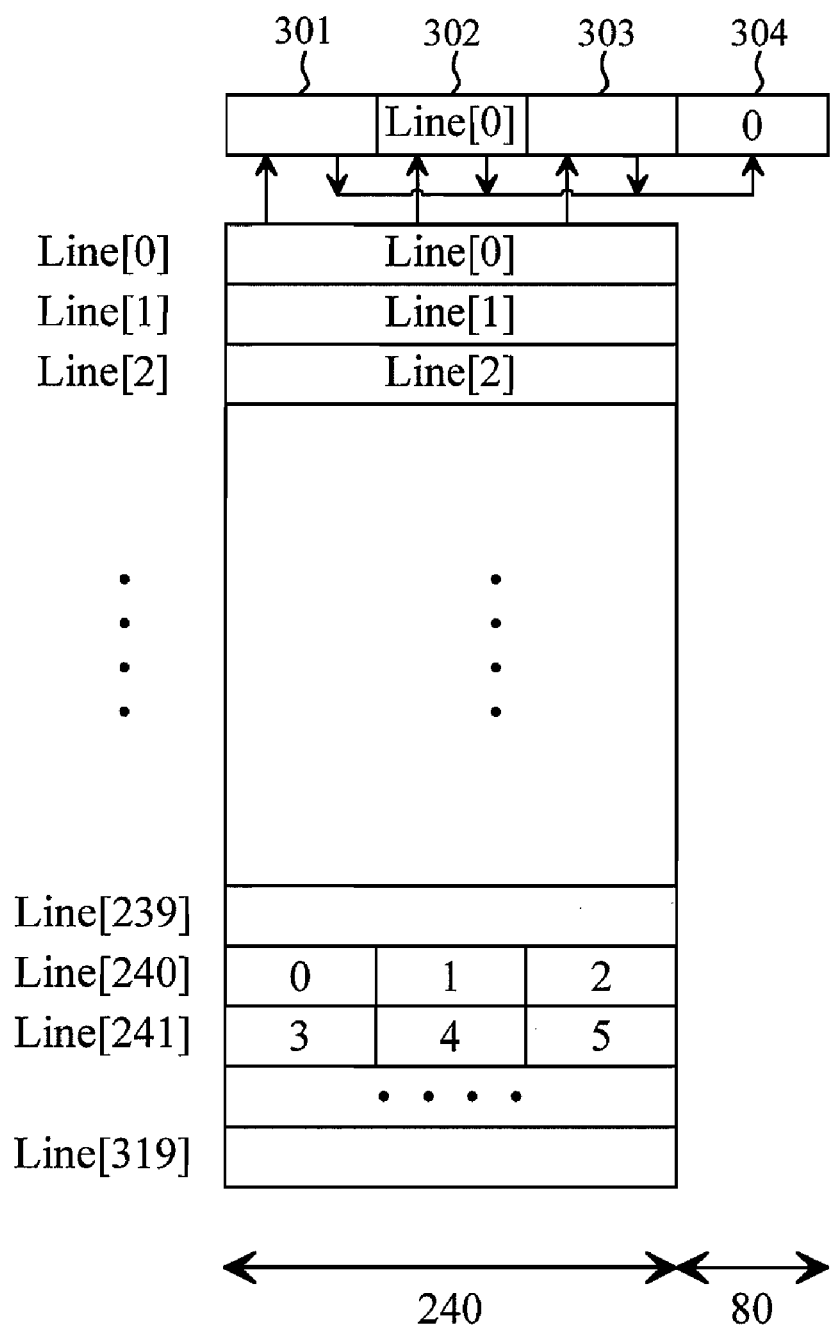

FIGS. 3A to 3D are schematic illustrations showing how the embodiment of the present invention reads the image, which has the resolution of 320×240 in the landscape mode and is stored in the frame memory 102. Referring first to FIG. 3A, the shift register 103 is divided into four blocks 301 to 304, and the data in the blocks 301 to 303 may be respectively shifted to the block 304. Referring next to FIG. 3B, if the data on the first scan line is to be taken out, the data on Line[240] will be taken out first and temporarily stored to the blocks 301 to 303 of the shift register 103. Next, as shown in FIG. 3C, the data in the block 301 of the shift register 103 is moved to the block 304 of the shift register 103. Next, as shown in FIG. 3D, the data on Line[0] is taken out to cover the blocks 301 to 303 of the shift register 103. Thereafter, the driving circuit 101 can drive the landscape mode display panel according to its predetermined driving operation procedure.

Figure 4A:
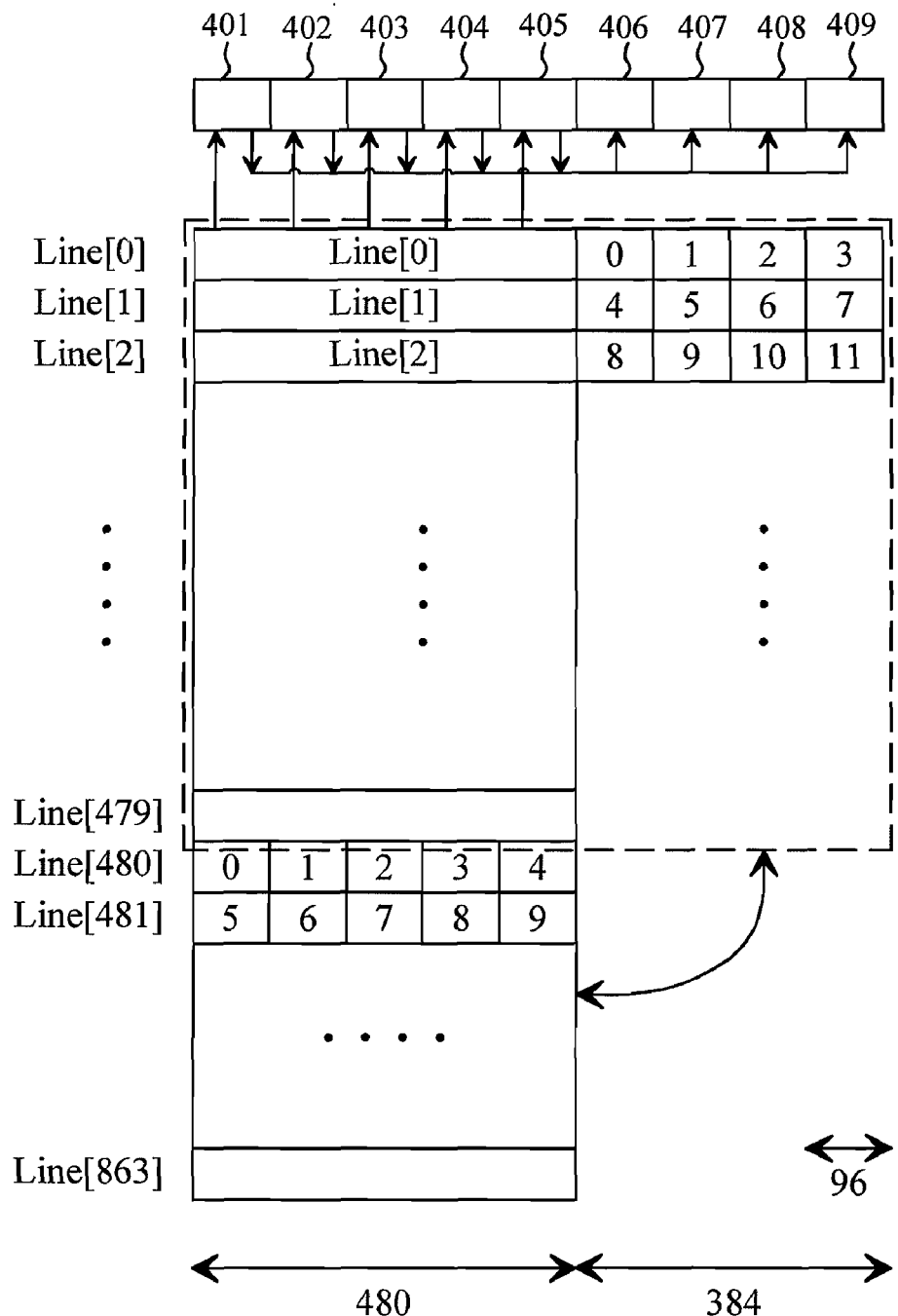
FIGS. 4A to 4F are schematic illustrations showing how the embodiment of the present invention reads the image, which has the resolution of 864×480 in the landscape mode and is stored in the frame memory 102.

Although the resolutions of 320×240 and 240×320 are illustrated as an example in the above-mentioned embodiment, the present invention is not limited thereto. The following another embodiment will be illustrated to make one of ordinary skill in the art widely apply the present invention. FIGS. 4A to 4F are schematic illustrations showing how the embodiment of the present invention reads the image, which has the resolution of 864×480 in the landscape mode and is stored in the frame memory 102. In this embodiment, the landscape mode corresponds to 864×480, and the frame memory 102 of this embodiment is used in conjunction with the resolution of 480×864. Referring first to FIG. 4A, the shift register 103 in this embodiment is divided into nine blocks 401 to 409, and the data in the blocks 401 to 405 may be respectively moved to the blocks 406 to 409.

Figure 4B:
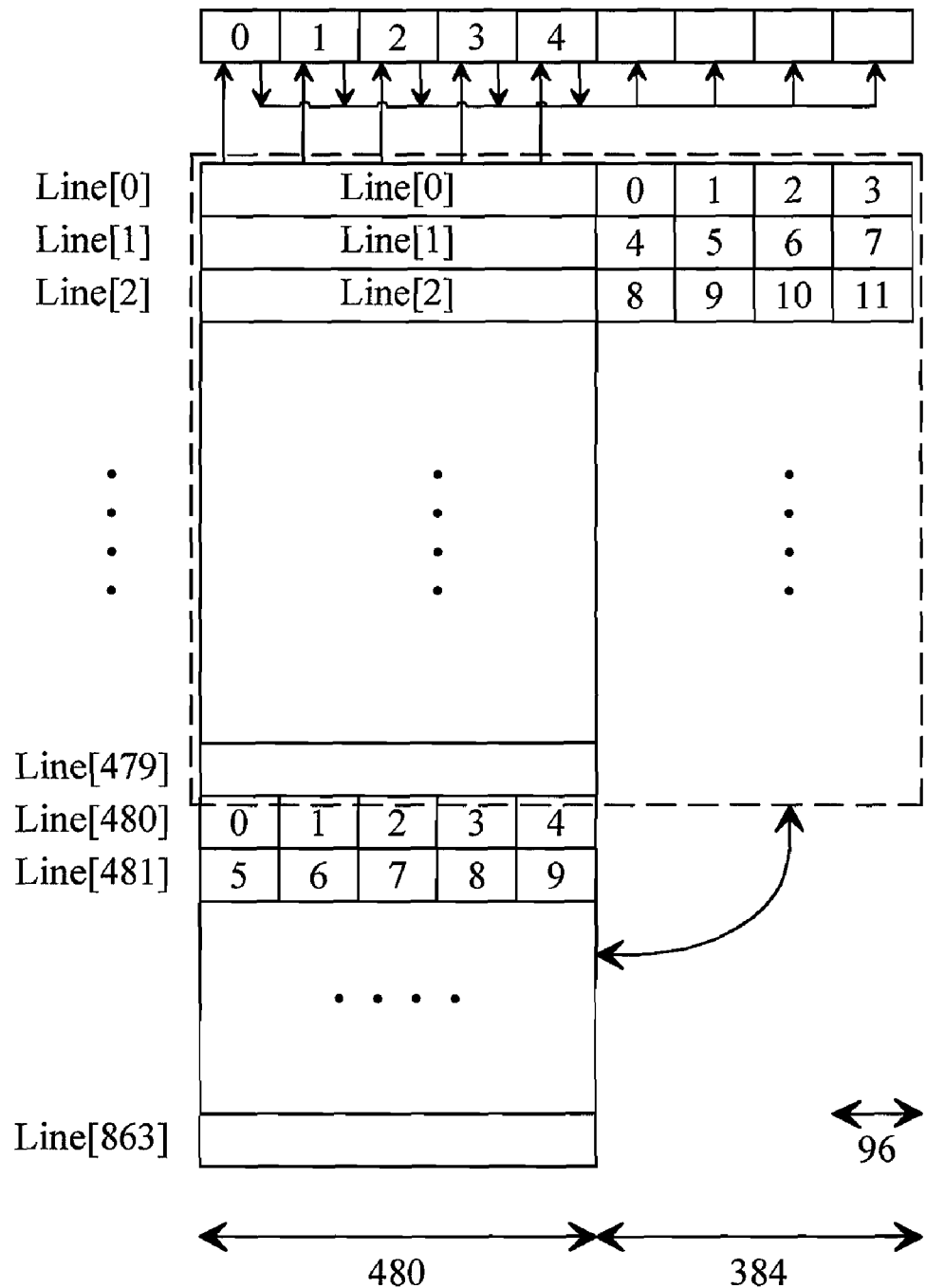
Figure 4C:
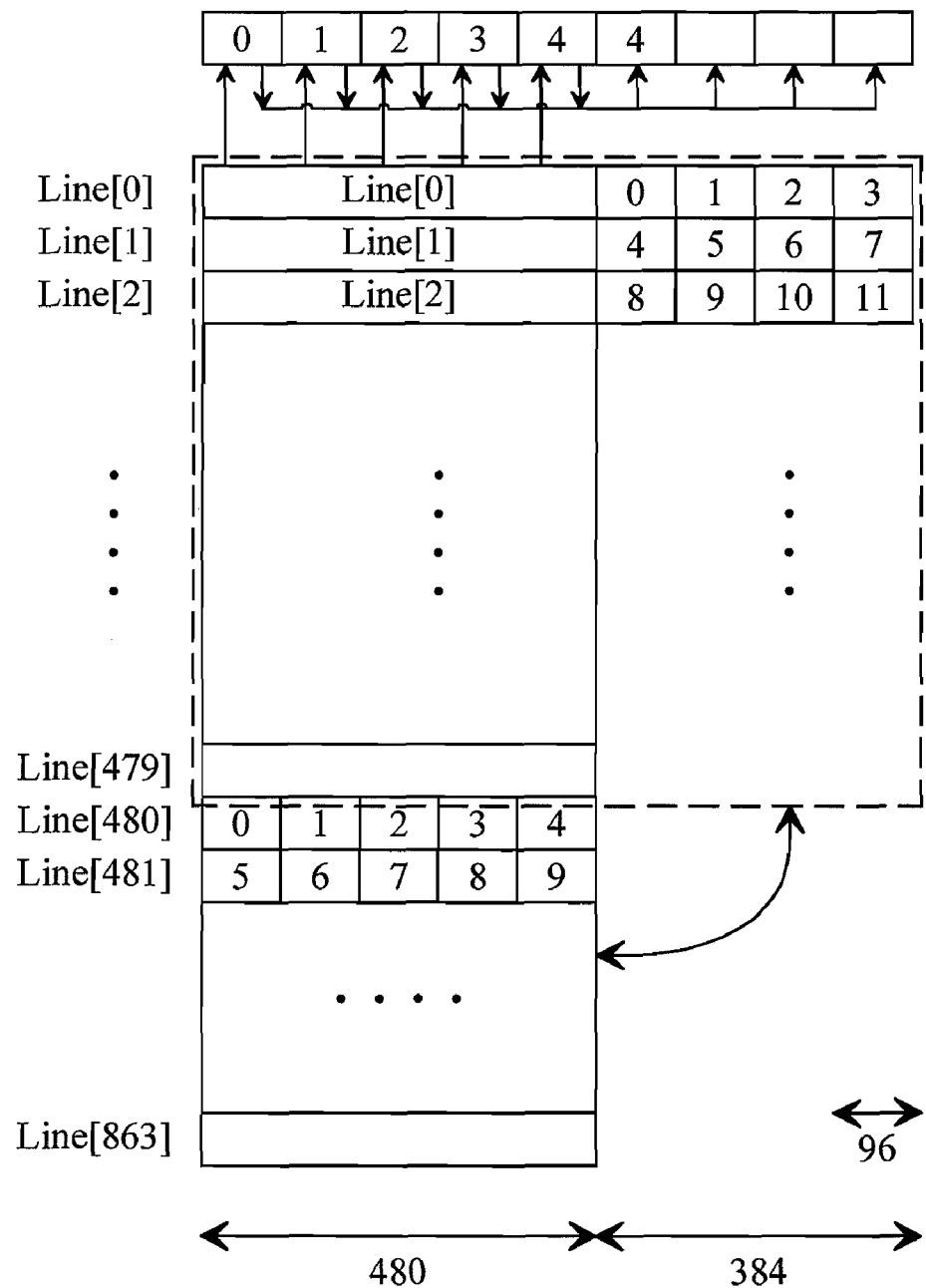
Figure 4D:
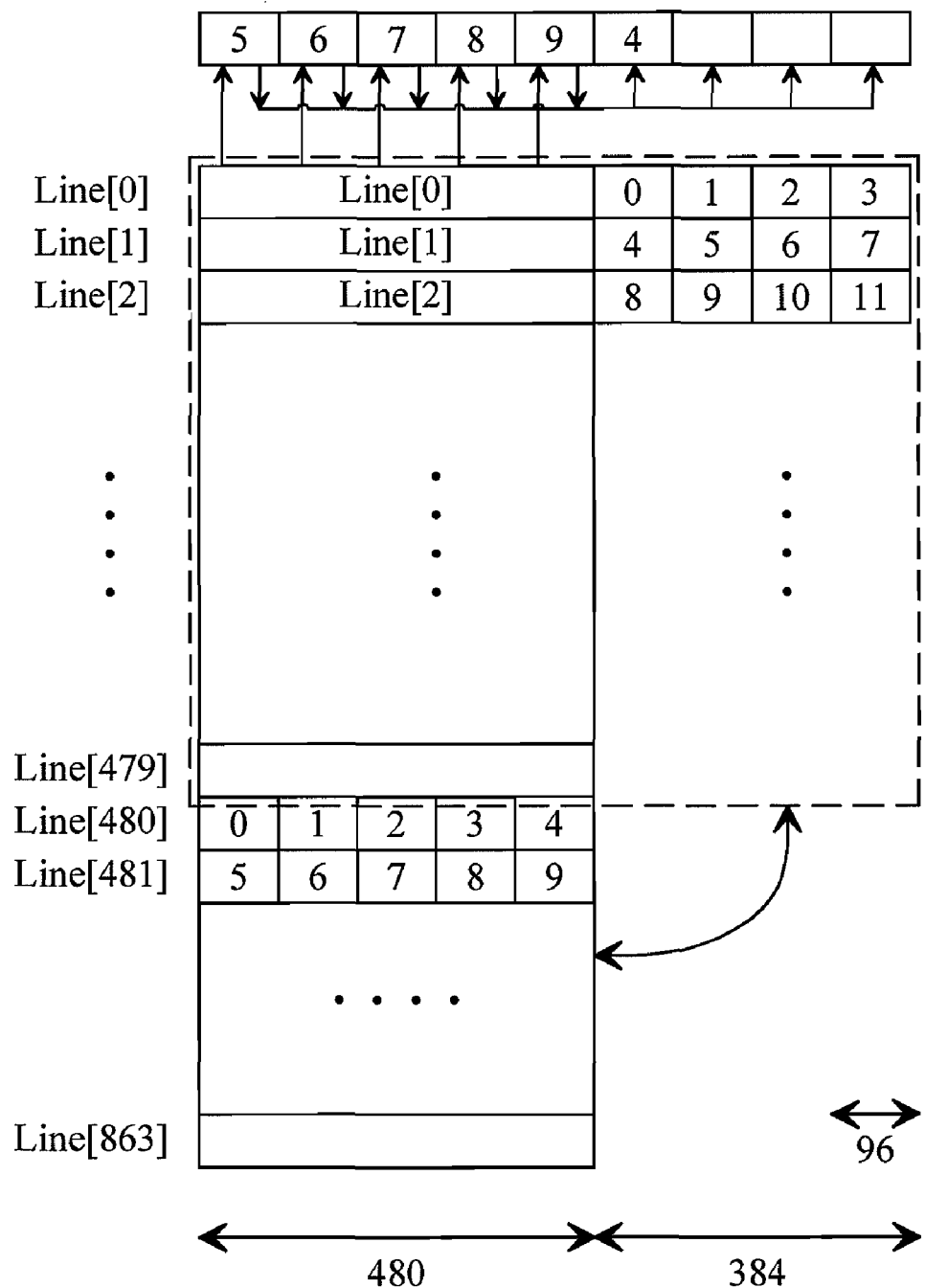
Figure 4E:
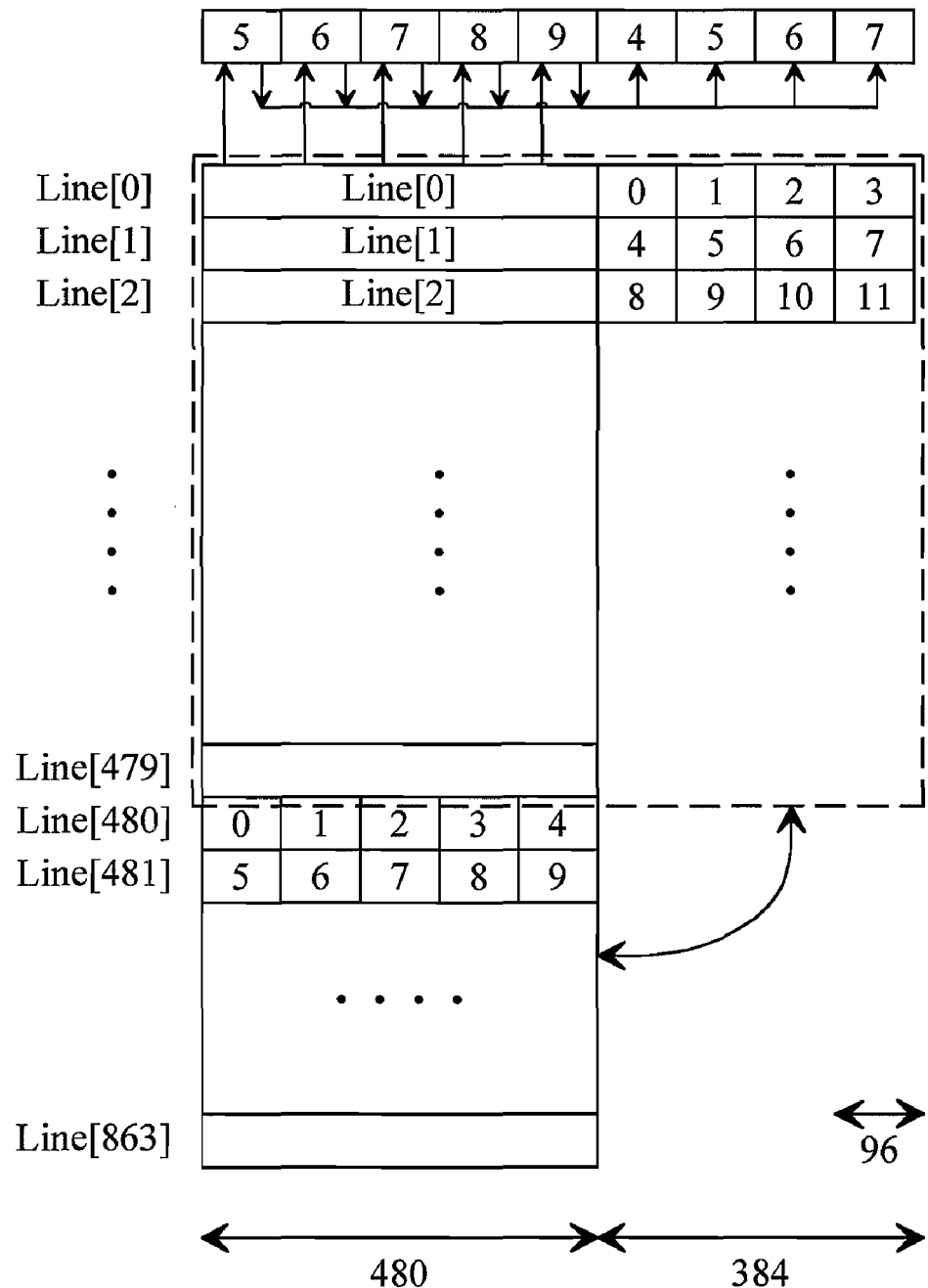
Figure 4F:
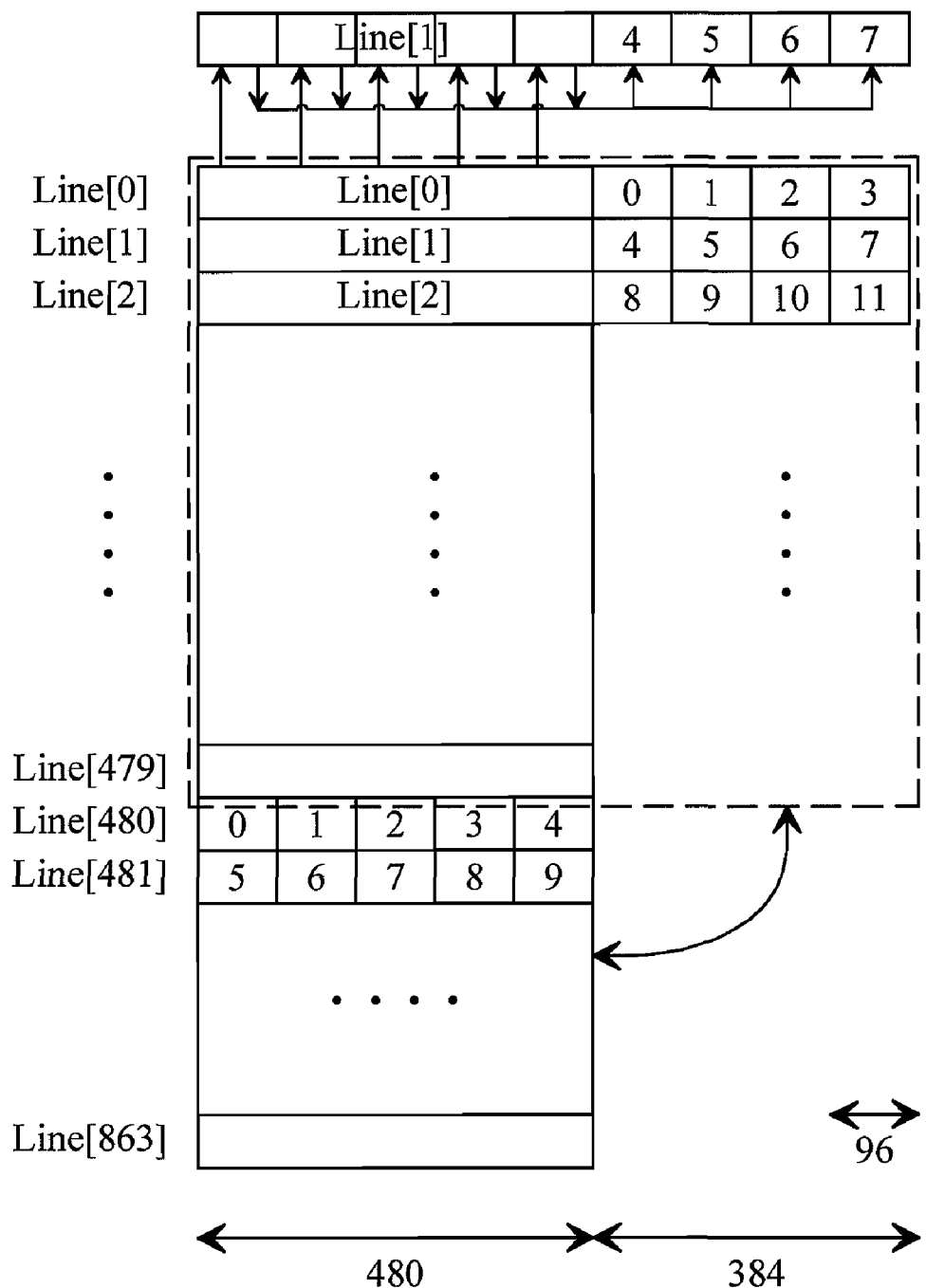

Referring next to FIG. 4B, if the data on the second scan line is to be taken out, then the data stored on Line[480] are firstly taken out and temporarily stored to the blocks 401 to 405 of the shift register 103. Next, as shown in FIG. 4C, the data in the block 405 of the shift register 103 is moved to the block 406 of the shift register 103. Then, as shown in FIG. 4D, the data stored on Line[481] is taken out to cover the blocks 401 to 405 of the shift register 103. Next, as shown in FIG. 4E, the data in the blocks 401 to 403 of the shift register 103 are respectively moved to the blocks 407 to 409 of the shift register 103. Thereafter, the driving circuit 101 may drive the landscape mode display panel according to its predetermined driving operation procedure.

In summary, the present invention mainly provides a data moving method of enabling the display driver integrated circuit with the built-in portrait style frame memory to be applied to the landscape mode. The spirit of this method is to repeatedly read the data from the portrait style frame memory and write the data to the shift register, to move the data over the shift register, and to put the data to the correct data latch so as to constitute the complete scan line data, and to transfer the complete scan line data to the pixel driving circuit. Thus, the portrait style display driver integrated circuit can drive the landscape mode display panel.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for frame memory access, the method comprising the steps of:
   correspondingly storing the $1^{st}$ to $M^{th}$ pixel data of the $1^{st}$ to $M^{th}$ rows of the image to the $1^{st}$ to $M^{th}$ rows of storage spaces of the memory; and
   sequentially and correspondingly storing the $(M+1)^{th}$ to $N^{th}$ pixel data of the $1^{st}$ to $M^{th}$ rows of the image to the $(M+1)^{th}$ to $N^{th}$ rows of storage spaces of the memory;
   wherein when the $i^{th}$ row of pixel data of the image stored in the memory are read, the method further comprises the steps of:
   reading the pixel data stored in the $k^{th}$ row of storage spaces of the memory to the $1^{st}$ to $M^{th}$ temporary storage positions of a shift register, wherein the $(M+1)^{th}$ to $N^{th}$ pixel data of the $i^{th}$ row of the image are stored in the $k^{th}$ row of storage spaces of the memory;
   shifting the $(M+1)^{th}$ to $N^{th}$ pixel data of the $i^{th}$ row of the image stored in the shift register to the $(M+1)^{th}$ to $N^{th}$ temporary storage positions of the shift register; and
   reading the pixel data stored in the $i^{th}$ row of storage spaces of the memory to the $1^{st}$ to $M^{th}$ temporary storage positions of the shift register,
   wherein N, M, i and k are natural numbers, and N>M, 0<i<=N, M<k<=N, wherein the method is for storing an image with N×M pixel data to a memory with M×N storage spaces;
   wherein when the $(M+1)^{th}$ to $X^{th}$ pixel data of the $i^{th}$ row are stored in the $k^{th}$ row of the memory, and $(X+1)^{th}$ to $N^{th}$ pixel data of the $i^{th}$ row are stored in the $(k+1)^{th}$ row of the memory, the method further comprises the steps of:
   reading the data stored in the $k^{th}$ row of storage spaces of the memory to the $1^{st}$ to $M^{th}$ temporary storage positions of the shift register;
   shifting the $(M+1)^{th}$ to $X^{th}$ pixel data of the $i^{th}$ row of the image stored in the shift register to the $(M+1)^{th}$ to $X^{th}$ temporary storage positions of the shift register;
   reading the data stored in the $(k+1)^{th}$ row of storage spaces of the memory to the $1^{st}$ to $M^{th}$ temporary storage positions of the shift register; and
   shifting the $(X+1)^{th}$ to $N^{th}$ pixel data of the $i^{th}$ row of the image stored in the shift register to the $(X+1)^{th}$ to $N^{th}$ temporary storage positions of the shift register, wherein X is a natural number, and M<x<=N.

2. A display driving device comprising:
   a memory having M×N storage spaces;
   a shift register having N temporary storage circuits, wherein the $i^{th}$ temporary storage circuit is coupled to the $i^{th}$ column of storage spaces of the memory;
   a driving circuit, wherein an $i^{th}$ input terminal of the driving circuit is coupled to the $i^{th}$ temporary storage circuit of the shift register, and each of the temporary storage circuits has a corresponding temporary storage position,
   wherein when the display driving device is for driving the panel having N×M pixels, a driving stage of the display driving device comprises a storing phase and a driving phase,
   wherein in the storing phase,
   the $1^{st}$ to $M^{th}$ pixel data of the $1^{st}$ to $M^{th}$ rows of an image having N×M pixel data are correspondingly stored to the $1^{st}$ to $M^{th}$ rows of storage spaces of the memory; and
   the $(M+1)^{th}$ to $N^{th}$ pixel data of the $1^{st}$ to $M^{th}$ rows of the image are sequentially and correspondingly stored to the $(M+1)^{th}$ to $N^{th}$ rows of storage spaces of the memory; and
   in an $i^{th}$ row of driving periods of the driving phase,
   the pixel data stored in the $k^{th}$ row of storage spaces of the memory are stored to the $1^{st}$ to $M^{th}$ temporary storage positions of the shift register, wherein the $k^{th}$ row of storage spaces of the memory store the $(M+1)^{th}$ to $N^{th}$ pixel data of the $i^{th}$ row of the image;
   the $(M+1)^{th}$ to $N^{th}$ pixel data of the $i^{th}$ row stored in the shift register are shifted to the $(M+1)^{th}$ to $N^{th}$ temporary storage positions of the shift register;
   the pixel data stored in the $i^{th}$ row of storage spaces of the memory are read to the $1^{st}$ to $M^{th}$ temporary storage positions of the shift register; and
   the pixel data stored in the shift register are read such that the driving circuit drive the $i^{th}$ row of pixels of the panel having N×M pixels,
   wherein, N, M, i and k are natural numbers, and N>M, 0<i<=N, M<k<=N, wherein the display driving device is adopted to drive a panel having N×M pixels or a panel having M×N pixels,
   wherein each of the pixel data has p sub-pixels, each of the sub-pixels has q bits, the temporary storage circuits of the shift register are divided into a plurality of temporary storage groups each having (p×q×r) bits, and the driving circuit comprises:
   N/r (p×q×r)-bit data latches correspondingly coupled to the temporary storage groups;
   N/r (p×q×r)-to-q multiplexers correspondingly coupled to the (p×q×r)-bit data latches; and
   N/(p×r) q-bit analog-to-digital converters correspondingly coupled to the (p×q×r)-to-q multiplexers,
   wherein p, q and r are natural numbers.

* * * * *